E. WARD.
NUT LOCK.
APPLICATION FILED SEPT. 7, 1920.
1,389,172.
Patented Aug. 30, 1921.
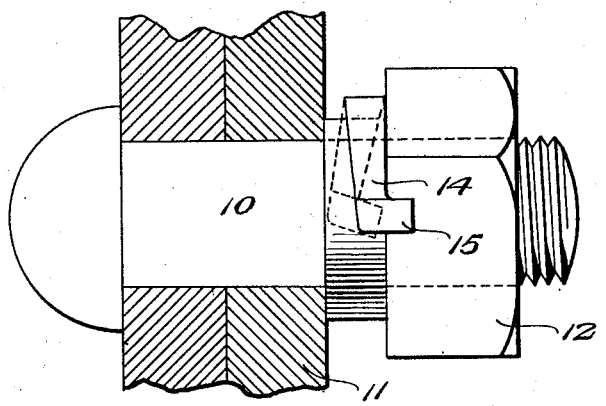
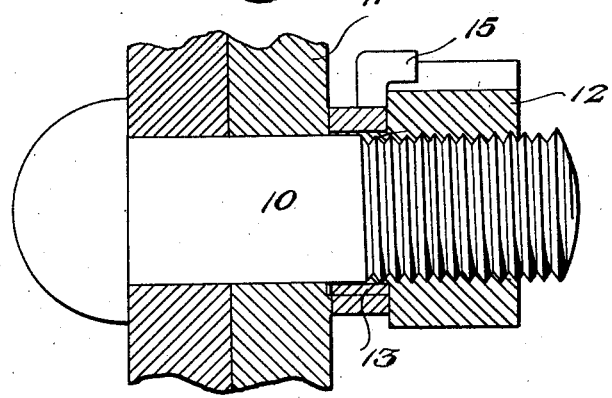
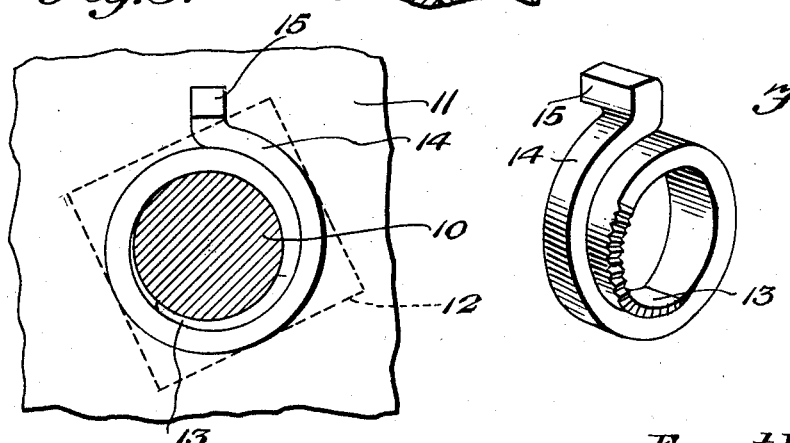
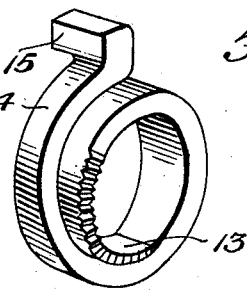
Ernest Ward
INVENTOR
BY Victor J. Evans
ATTORNEY
WITNESS:

UNITED STATES PATENT OFFICE.

ERNEST WARD, OF INDEPENDENCE, MISSOURI.

NUT-LOCK.

1,389,172.　　　　Specification of Letters Patent.　　Patented Aug. 30, 1921.

Application filed September 7, 1920.  Serial No. 408,447.

*To all whom it may concern:*

Be it known that I, ERNEST WARD, a citizen of the United States, residing at Independence, in the county of Jackson and State of Missouri, have invented new and useful Improvements in Nut-Locks, of which the following is a specification.

This invention relates to improvements in nut locks and has for an object provision for a washer which engages both the nut and the object through which the nut passes, to lock the nut against accidental removal.

Another object is the provision of a lock washer which is formed of a single strip of material and bent into the form of a coil having a central opening, the said strip being provided at one end with an axially movable lug and at its opposite end with a shortened serrated terminal which provides a biting engagement.

Other objects and advantages of the invention will appear as the following description is read in connection with the accompanying drawings.

In the drawings:—

Figure 1 is a sectional elevation showing the application of the invention.

Fig. 2 is a section on the line 2—2 of Fig. 1.

Fig. 3 is a similar view on the line 3—3 of Fig. 1.

Fig. 4 is a detailed perspective view of the lock washer.

Referring to the drawings in detail, the reference character 10 indicates a portion of a bolt which is shown as passing through an opening provided in a plate 11, or other object, while the nut is indicated at 12.

The invention which is in the form of a lock washer is made from a single strip of preferably malleable metal, being tapered at one end by reducing the thickness of the strip as indicated at 13 and tapered at its opposite end by reducing the width of the strip as indicated at 14. The strip is then coiled in the manner shown in Fig. 3 so as to provide an annulus having an opening for the passage of the bolt, the reduced end 13 forming the innermost convolution of the coil. This places the reduced end 14 upon the outside so that the edge of the portion 13 will extend above the edge of the portion 14 and form a shortened wedge-like element which will bite into the object against which it is placed, for example the plate 11. The width of the reduced portion 14 is approximately one-half the width of the intermediate portion of the washer so that the said portion 14 may be moved axially and transversely of the width within the confines of the edges of the washer. The extremity of the portion 14 is formed into a lug 15 whose length is approximately the same as the width of the intermediate or body portion of the washer and when the parts are in the position shown in Figs. 1 and 2, the lug 15 will extend over into engagement with one of the sides of the nut. Owing to the malleable nature of the washer, the portion 14 may be moved to the position shown by the dotted lines in Fig. 1 so as to permit the nut to turn freely. If desired, the tapered portion 13 may be serrated along its projecting edge so as to more securely engage the plate.

In the use of the invention, the lug is moved to the position shown by the dotted lines in Fig. 1, whereupon the nut may be tightly screwed into position so that the portion 13 will engage the plate or other object 11. The lug 15 may be then moved into engagement with the nut and accidental rotation of the latter thereby prevented.

The invention is susceptible of various changes in its form, proportions and minor details of construction and the right is herein reserved to make such changes as properly fall within the scope of the appended claim.

Having described the invention what is claimed is:—

A nut lock comprising a washer formed of a single strip of material and tapering in width at one end and in thickness at its opposite end, the said strip being coiled to provide an annulus having the tapered width end located in the innermost convolution and the tapered thickness in the outermost convolution, whereby the latter may be moved transversely of the width of the washer within said width and a lug carried by the tapered end of the strip and disposed axially of the washer and normally projecting beyond its edge.

In testimony whereof I affix my signature.

ERNEST WARD.